(12) United States Patent
Wang et al.

(10) Patent No.: US 12,386,091 B2
(45) Date of Patent: Aug. 12, 2025

(54) SINGLE-WELL REFLECTED HORIZONTAL SHEAR WAVE IMAGING WITH MIXED TYPES OF TRANSMITTERS AND RECEIVERS

(71) Applicant: Halliburton Energy Services, Inc., Houston, TX (US)

(72) Inventors: Ruijia Wang, Singapore (SG); Brian Hornby, Fulshear, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 343 days.

(21) Appl. No.: 16/652,296

(22) PCT Filed: Apr. 29, 2019

(86) PCT No.: PCT/US2019/029661
§ 371 (c)(1),
(2) Date: Mar. 30, 2020

(87) PCT Pub. No.: WO2020/222744
PCT Pub. Date: Nov. 5, 2020

(65) Prior Publication Data
US 2021/0231822 A1 Jul. 29, 2021

(51) Int. Cl.
*G01V 1/50* (2006.01)
*E21B 47/12* (2012.01)
(Continued)

(52) U.S. Cl.
CPC .............. *G01V 1/50* (2013.01); *E21B 47/12* (2013.01); *G01V 1/284* (2013.01); *G01V 1/46* (2013.01); *G01V 2200/16* (2013.01)

(58) Field of Classification Search
CPC . G01V 1/50; G01V 1/284; G01V 1/46; G01V 2200/01; E21B 47/12
See application file for complete search history.

(56) References Cited

U.S. PATENT DOCUMENTS

| | | | |
|---|---|---|---|
| 4,817,059 A | 3/1989 | Hornby et al. | |
| 4,832,148 A * | 5/1989 | Becker | G01V 1/46 |
| | | | 181/104 |

(Continued)

FOREIGN PATENT DOCUMENTS

WO  WO-2017172805 A1 * 10/2017 ............. E21B 47/14

OTHER PUBLICATIONS

ISRWO International Search Report and Written Opinion for PCT/US2019/029661 Jan. 23, 2020.

(Continued)

*Primary Examiner* — Shelby A Turner
*Assistant Examiner* — Xiuqin Sun
(74) *Attorney, Agent, or Firm* — John Wustenberg; C. Tumey Law Group PLLC

(57) ABSTRACT

A borehole sonic logging tool and method for imaging. The borehole sonic logging tool may comprise a transmitter configured to transmit a sonic waveform into a formation, wherein the transmitter is a dipole, and a receiver configured to record a reflected wave as waveform data, wherein the receiver is a quadrupole. A method may comprise disposing a downhole tool into a borehole, selecting a frequency range for the transmitter to a horizontally-polarized shear formation body wave, broadcasting the sonic waveform as the horizontally-polarized shear formation body wave into the formation penetrated by the borehole with the transmitter, recording a reflected wave on the receiver as waveform data, wherein the reflected wave is the horizontally-polarized shear formation body wave reflected from a reflector, and processing the waveform data with an information handling system.

12 Claims, 8 Drawing Sheets

(51) Int. Cl.
*G01V 1/28* (2006.01)
*G01V 1/46* (2006.01)

(56) References Cited

U.S. PATENT DOCUMENTS

| | | | |
|---|---|---|---|
| 6,332,507 B1 | 12/2001 | Naville et al. | |
| 6,714,480 B2 * | 3/2004 | Sinha | G01V 1/48 |
| | | | 702/18 |
| 7,035,165 B2 | 4/2006 | Tang | |
| 11,828,897 B2 * | 11/2023 | Davies | G01V 1/006 |
| 2003/0002388 A1 | 1/2003 | Mandal | |
| 2004/0001389 A1 * | 1/2004 | Tang | G01V 1/50 |
| | | | 366/31 |
| 2007/0097788 A1 | 5/2007 | Tang et al. | |
| 2008/0151690 A1 * | 6/2008 | Tang | G01V 1/44 |
| | | | 702/11 |
| 2009/0205899 A1 * | 8/2009 | Geerits | G01V 1/44 |
| | | | 181/106 |
| 2012/0037423 A1 * | 2/2012 | Geerits | G01V 1/48 |
| | | | 175/50 |
| 2013/0179082 A1 * | 7/2013 | Geerits | G01V 1/42 |
| | | | 702/11 |
| 2017/0212274 A1 | 7/2017 | Sun et al. | |
| 2018/0045844 A1 | 2/2018 | Oshima et al. | |
| 2019/0018161 A1 | 1/2019 | Wang et al. | |
| 2019/0018162 A1 | 1/2019 | Wang et al. | |
| 2019/0293823 A1 | 9/2019 | Sun et al. | |
| 2020/0033494 A1 * | 1/2020 | Patterson | E21B 49/00 |
| 2020/0072036 A1 | 3/2020 | Wang | |

OTHER PUBLICATIONS

Schlumberger, Sonic Scanner, Acoustic Scanning Platform, Nov. 2005.
Baker Hughes, XMAC F1 Service, High-quality acoustic data in the most challenging environments, 2011.
Halliburton, Xaminer Sonic Imager Service, H011818, Nov. 2018.
Halliburton, Xaminer Array Sonic Tool (XAST) Service, Ultra-Reliable Crossed-Dipole Sonic Tool, 2016. H011647.
Sperry—XBAT Plus Azimuthal Sonic and Ultrasonic LWD Service, Halliburton, May 2019. H013097.

* cited by examiner

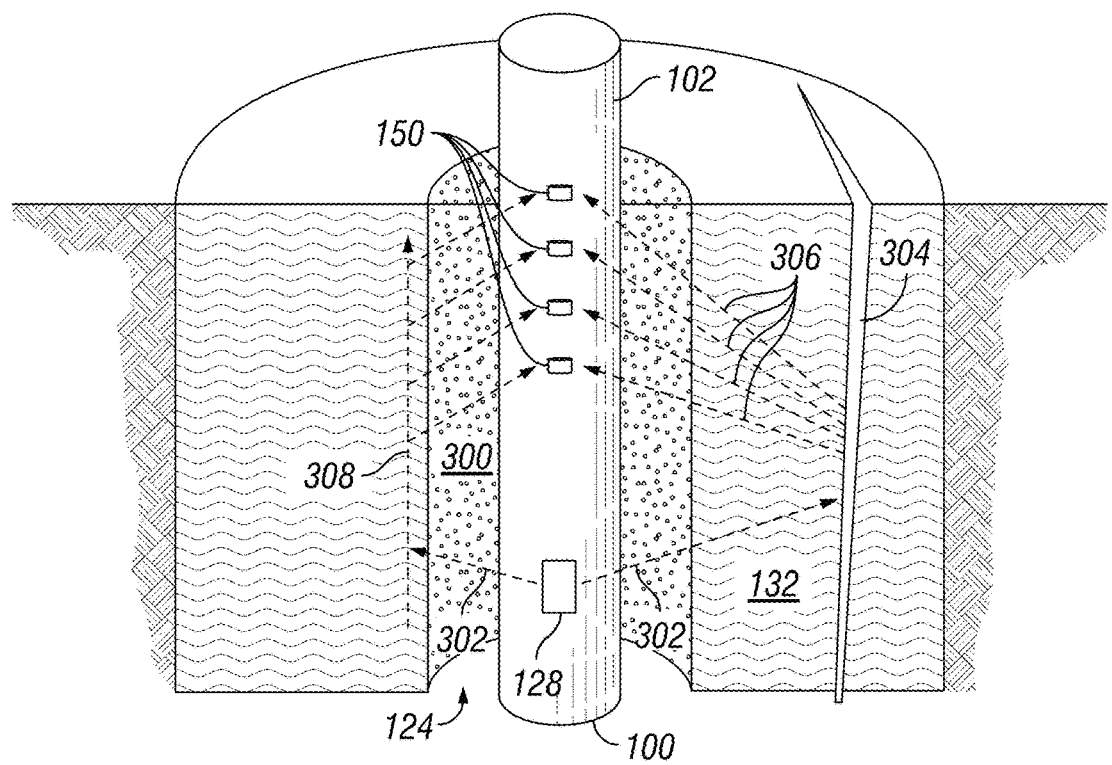
FIG. 3
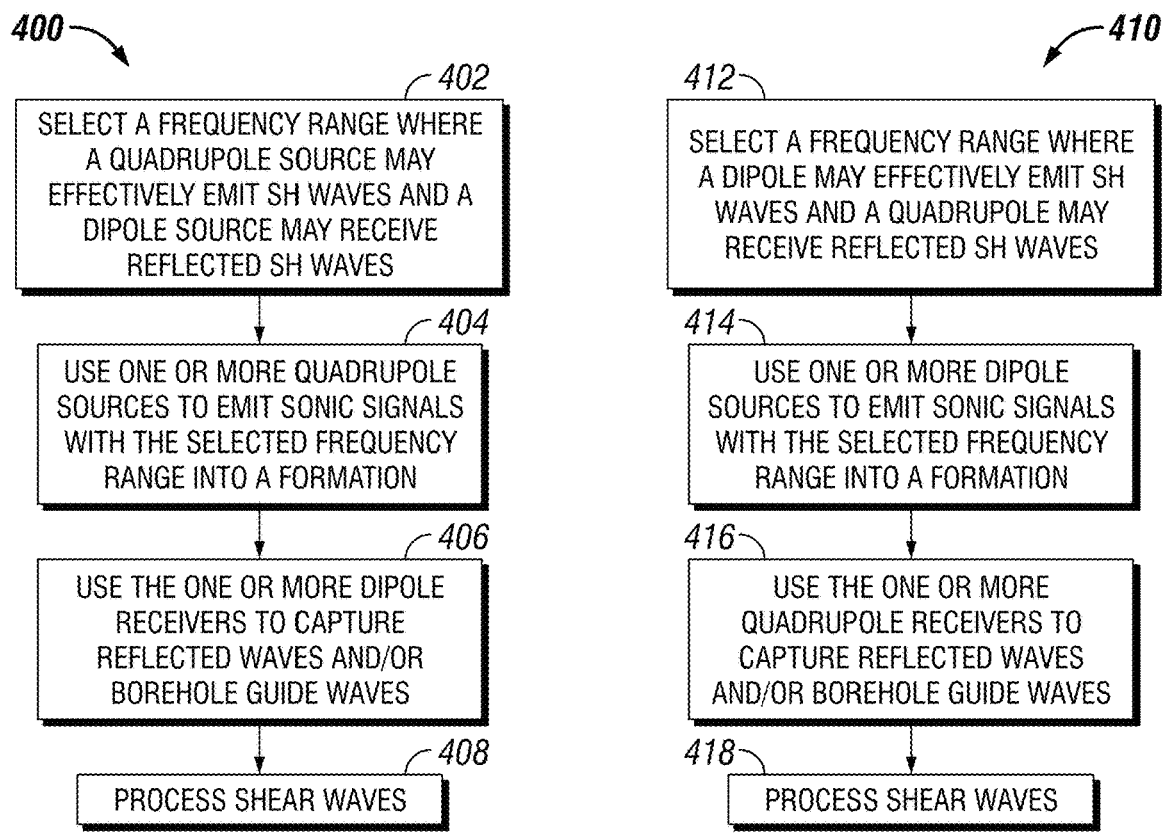
FIG. 4A
FIG. 4B

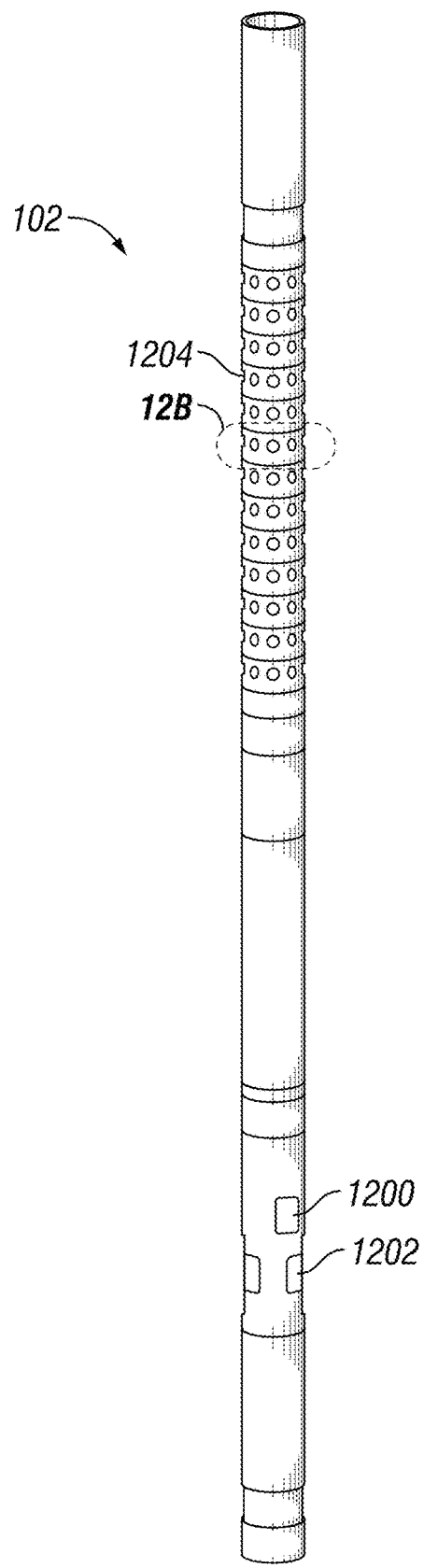
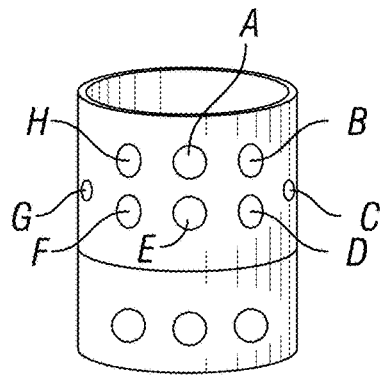
FIG. 12B
FIG. 12A

SINGLE-WELL REFLECTED HORIZONTAL SHEAR WAVE IMAGING WITH MIXED TYPES OF TRANSMITTERS AND RECEIVERS

BACKGROUND

In order to obtain hydrocarbons such as oil and gas, boreholes are drilled through hydrocarbon-bearing subsurface formations. Logging tests are subsequently made to determine the properties of formations surrounding the borehole. In wireline logging, a drilling apparatus that forms the borehole is removed so that testing equipment can be lowered into the borehole for testing. In measurement-while-drilling techniques, the testing equipment is conveyed down the borehole along with the drilling equipment. These tests may include resistivity testing equipment, gamma radiation testing equipment, seismic imaging equipment, etc. Seismic imaging using borehole acoustic measurements may obtain an image of the formation structural changes away from the borehole.

Traditional methods for reflection sonic imaging of formation structural changes away from the borehole use the same type of transmitter and receiver for reflected horizontal shear wave imaging. Such methods sometimes suffer due to the strong borehole modes. This may bury and/or "wash out" desired reflected signals in the borehole mode signal.

BRIEF DESCRIPTION OF THE DRAWINGS

These drawings illustrate certain aspects of some examples of the present disclosure, and should not be used to limit or define the disclosure.

FIG. 3 illustrate an example of a borehole sonic logging tool disposed in a borehole;

FIG. 4A is a workflow for utilizing a quadrupole transmitter;

FIG. 4B is a workflow for utilizing a dipole transmitter;

FIGS. 12A and 12B illustrate an example of a sonic tool with the capability for firing dipole signals and receiving quadrupole signals.

DETAILED DESCRIPTION

This disclosure may generally relate to systems and methods for measuring reflected waves from a reflector and borehole guide waves with a hybrid receiver and/or transmitter combination. Implementing a hybrid transmitter and/or receiver combination may decrease the influence of borehole guided waves. In examples, a hybrid transmitter and/or receiver combination may be a combination of a dipole transmitter and a quadrupole receiver.

Figure 1:
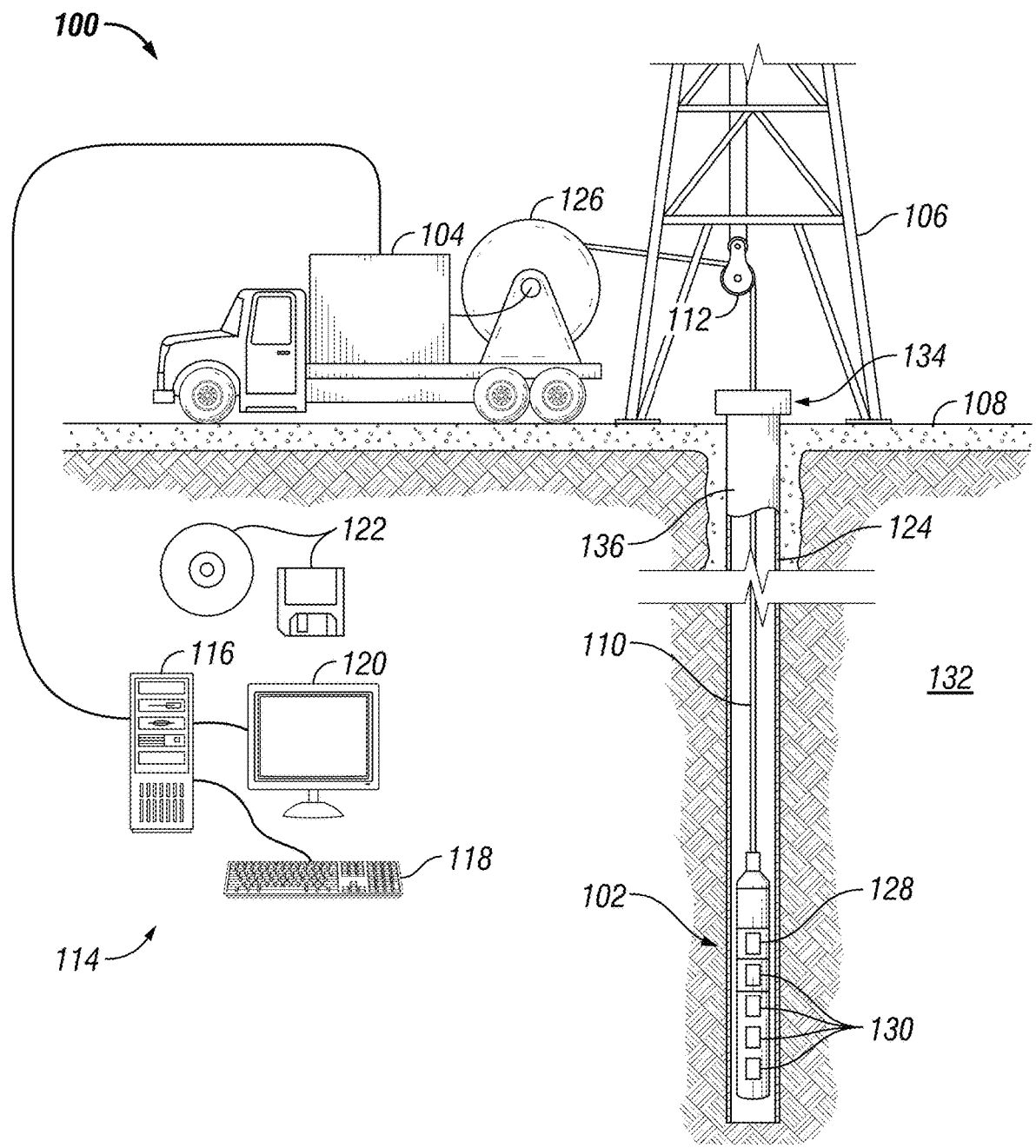
FIG. 1 illustrate an example of a borehole sonic logging system.

FIG. 1 illustrates a cross-sectional view of a borehole sonic logging system 100. As illustrated, borehole sonic logging system 100 may comprise a borehole sonic logging tool 102 attached to a vehicle 104. In examples, it should be noted that borehole sonic logging tool 102 may not be attached to a vehicle 104. Borehole sonic logging tool 102 may be supported by rig 106 at surface 108. Borehole sonic logging tool 102 may be tethered to vehicle 104 through conveyance 110. Conveyance 110 may be disposed around one or more sheave wheels 112 to vehicle 104. Conveyance 110 may include any suitable means for providing mechanical conveyance for borehole sonic logging tool 102, including, but not limited to, wireline, slickline, coiled tubing, pipe, drill pipe, downhole tractor, or the like. In some embodiments, conveyance 110 may provide mechanical suspension, as well as electrical connectivity, for borehole sonic logging tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and borehole sonic logging tool 102. Information from borehole sonic logging tool 102 may be gathered and/or processed by information handling system 114. For example, signals recorded by borehole sonic logging tool 102 may be stored on memory and then processed by borehole sonic logging tool 102. The processing may be performed real-time during data acquisition or after recovery of borehole sonic logging tool 102. Processing may alternatively occur downhole or may occur both downhole and at surface. In some embodiments, signals recorded by borehole sonic logging tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to borehole sonic logging tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a input device 118 (e.g., keyboard, mouse, etc.) and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As illustrated, borehole sonic logging tool 102 may be disposed in borehole 124 by way of conveyance 110. Borehole 124 may extend from a wellhead 134 into a formation 132 from surface 108. Generally, borehole 124 may include horizontal, vertical, slanted, curved, and other types of borehole geometries and orientations. Borehole 124 may be cased or uncased. In examples, borehole 124 may comprise a metallic material, such as tubular 136. By way of example, the tubular 136 may be a casing, liner, tubing, or other elongated steel tubular disposed in borehole 124. As illustrated, borehole 124 may extend through formation 132. Borehole 124 may extend generally vertically into the formation 132. However, borehole 124 may extend at an angle through formation 132, such as horizontal and slanted boreholes. For example, although borehole 124 is illustrated as a vertical or low inclination angle well, high inclination angle or horizontal placement of the well and equipment may be possible. It should further be noted that while borehole 124 is generally depicted as a land-based operation, those skilled in the art may recognize that the principles described herein are equally applicable to subsea operations that employ floating or sea-based platforms and rigs, without departing from the scope of the disclosure.

In examples, rig 106 includes a load cell (not shown) which may determine the amount of pull on conveyance 110 at surface 108 of borehole 124. While not shown, a safety valve may control the hydraulic pressure that drives drum 126 on vehicle 104 which may reel up and/or release conveyance 110 which may move borehole sonic logging tool 102 up and/or down borehole 124. The safety valve may be adjusted to a pressure such that drum 126 may only impart a small amount of tension to conveyance 110 over and above the tension necessary to retrieve conveyance 110 and/or borehole sonic logging tool 102 from borehole 124. The safety valve is typically set a few hundred pounds above the amount of desired safe pull on conveyance 110 such that once that limit is exceeded; further pull on conveyance 110 may be prevented.

In examples, borehole sonic logging tool 102 may operate with additional equipment (not illustrated) on surface 108 and/or disposed in a separate borehole sonic logging system (not illustrated) to record measurements and/or values from formation 132. Borehole sonic logging tool 102 may comprise a transmitter 128. Transmitter 128 may be connected to information handling system 114, which may further control the operation of transmitter 128. Transmitter 128 may include any suitable transmitter for generating sound waves that travel into formation 132, including, but not limited to, piezoelectric transmitters. Transmitter 128 may be a monopole source or a multi-pole source (e.g., a dipole source). Combinations of different types of transmitters may also be used. During operations, transmitter 128 may broadcast sound waves (e.g., sonic waveforms) from borehole sonic logging tool 102 that travel into formation 132. The sound waves may be emitted at any suitable frequency range. For example, a broad band response could be from about 0.2 KHz to about 20 KHz, and a narrow band response could be from about 1 KHZ to about 6 KHz. It should be understood that the present technique should not be limited to these frequency ranges. Rather, the sounds waves may be emitted at any suitable frequency for a particular application.

Borehole sonic logging tool 102 may also include a receiver 130. As illustrated, there may be a plurality of receivers 130 disposed on borehole sonic logging tool 102. Receiver 130 may include any suitable receiver for receiving sound waves, including, but not limited to, piezoelectric receivers. For example, the receiver 130 may be a monopole receiver or multi-pole receiver (e.g., a dipole receiver). In examples, a monopole receiver 130 may be used to record compressional-wave (P-wave) signals, while the multi-pole receiver 130 may be used to record shear-wave (S-wave) signals. Receiver 130 may measure and/or record sound waves broadcast from transmitter 128 as received signals. The sound waves received at receiver 130 may include both direct waves that traveled along the borehole 124 and refract through formation 132 as well as waves that traveled through formation 132 and reflect off of near-borehole bedding and propagate back to the borehole. The reflected waves may include, but are not limited to, compressional (P) waves and shear(S) waves. By way of example, the received signal may be recorded as an acoustic amplitude as a function of time. Information handling system 114 may control the operation of receiver 130. The measured sound waves may be transferred to information handling system 114 for further processing. In examples, there may be any suitable number of transmitters 128 and/or receivers 130, which may be controlled by information handling system 114. Information and/or measurements may be processed further by information handling system 114 to determine properties of borehole 124, fluids, and/or formation 132. By way of example, the sound waves may be processed to generate a reflection image of formation structures, which may be used for dip analysis as discussed in more detail below.

Figure 2:
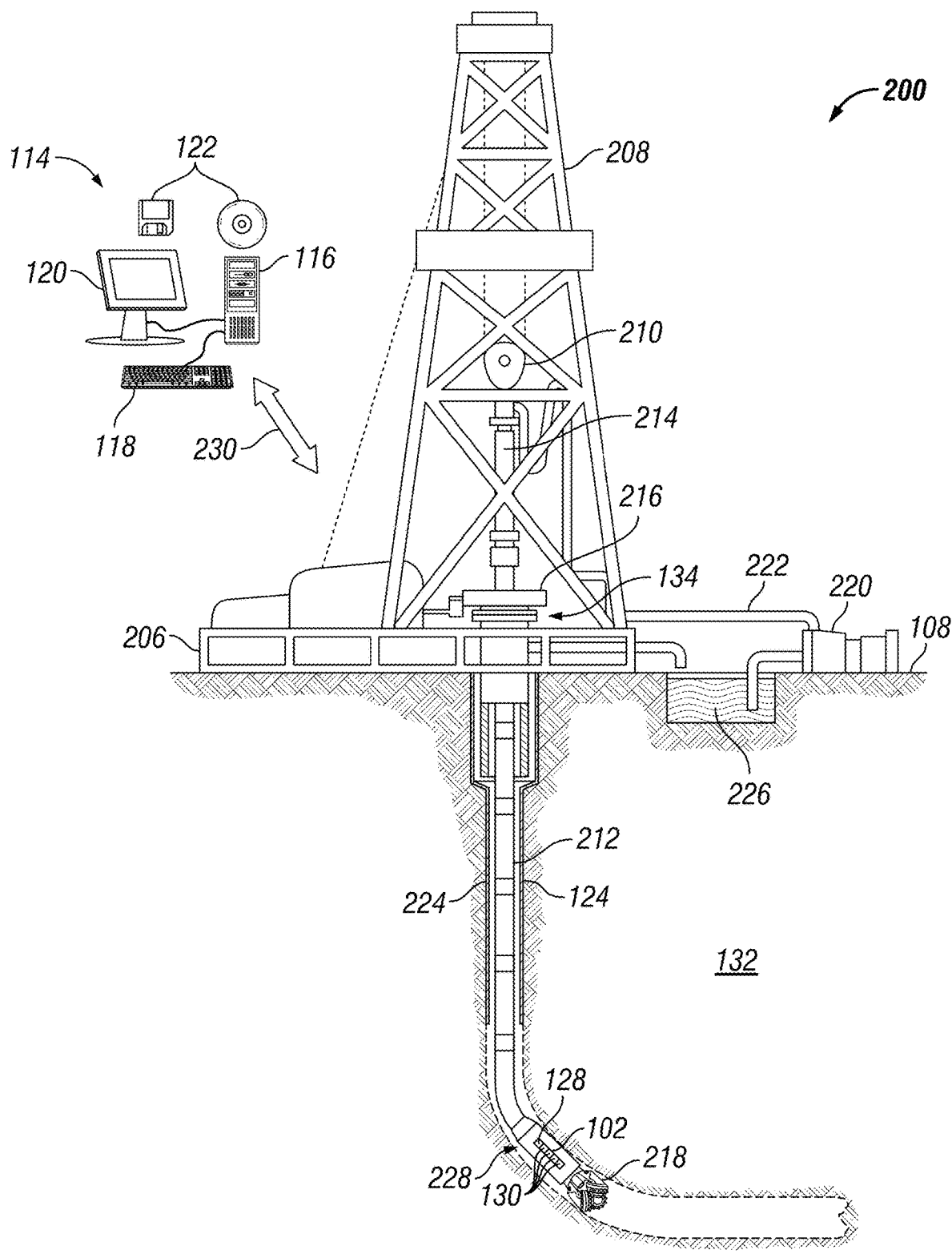
FIG. 2 illustrates an example of a drilling system.

FIG. 2 illustrates an example in which borehole sonic logging tool 102 may be included in a drilling system 200. As illustrated, borehole 124 may extend from wellhead 134 into formation 132 from surface 108. A drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various subterranean formations 204. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse borehole 124. Drill bit 218 may be attached to a distal end of drill string 212 and may be driven, for example, either by a downhole motor and/or via rotation of drill string 212 from surface 108. Drill bit 218 may be a part of bottom hole assembly 228 at distal end of drill string 212. Bottom hole assembly 228 may further comprise borehole sonic logging tool 102. Borehole sonic logging tool 102 may be disposed on the outside and/or within bottom hole assembly 228. Borehole sonic logging tool 102 may comprise a plurality of transmitters 128 and/or receivers 130. Borehole sonic logging tool 102 and/or the plurality of transmitters 128 and receivers 130 may operate and/or function as described above. As will be appreciated by those of ordinary skill in the art, bottom hole assembly 228 may be a measurement-while drilling (MWD) and/or logging-while-drilling (LWD) system.

Without limitation, bottom hole assembly 228, transmitter 128, and/or receiver 130 may be connected to and/or controlled by information handling system 114, which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a communication line (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive, as well as process, information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided which may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of processing at surface 108, processing may occur downhole.

FIG. 3 illustrates an example of shear wave imaging with borehole sonic logging tool 102. As illustrated, borehole sonic logging tool 102 may be disposed in a borehole 124, which may be filled with fluid 300. In examples, transmitter 128 may emit sonic waveforms 302 into borehole 124. In examples, at least one sonic waveform 302 may travel into formation 132 and may be reflected as a reflected signal 306 by a reflector 304 in formation 132. Without limitation, reflector 304 may be a formation boundary, a fault, a cave, or a fracture. In examples, reflected signals 306 may travel back to borehole 124 and may be captured by receivers 130 in borehole 124. Simultaneously, sonic waveforms 302 signals which may become trapped in borehole 124 as borehole guide waves 308 may propagate along the axis of borehole 124 and may be captured by receivers 130. In examples, borehole guide waves 308 may "wash out" reflected signals 306, which may reflect from reflector 304 away from borehole 124. For example, borehole guide waves 308 may prevent reflected signals 306 from being recorded or may be recorded over reflected signals 306.

Reflected signals 306 may be captured utilizing the same type of transmitter 128 and receiver 130. For example, both transmitter 128 and receiver 130 may be a monopole or a dipole. As illustrated in FIG. 3, both borehole guide waves 308 and reflected signals 306 may be recorded by receiver 130. Generally, a filtering procedure may be remove borehole guided waves 308, which may be considered noise when imaging with reflected waves 306.

However, for detecting reflected signals 306 that travel at least one wavelength from a reflector 304, receiver 130 and transmitter 128 may not need to be the same type of device. For example, in single-well imaging techniques a transmitter 128 may emit sonic waveform 302 as a formation body wave. A formation body wave may be transmitted and received by type of transmitter 128 and/or receiver 130. Additionally, formation body waves that may be transmitted or received by different types of transmitters 128 or receivers 130 may also be formation body waves. Therefore, using mixed (e.g., different) types of transmitters 128 and receivers 138 (e.g., monopole, dipole, etc.) may be a feasible solution for far-detection of reflected signals 306.

During measurement operations, utilizing mixed-types of transmitters 128 and receivers 130 may suppress borehole guide waves 308. For example, if transmitter 128 and receiver 130 are of different types, no signal will be recorded. However, because of tool eccentricity or other factors, coupled wave field with other azimuthal types might be generated, and receiver 130 may capture at least a portion of coupled wave fields.

During measurement operations which may use horizontal-polarized shear waves, all types of transmitters 128, except a monopole transmitter, may generate any formation body wave into formation 132, with continued reference to FIG. 3. For example, a dipole transmitter may generate horizontally-polarized shear formation body waves with a radiation pattern of a numerical "8." Likewise, a quadrupole source may generate horizontally-polarized shear formation body waves in formation 132 with a radiation pattern of 'quatrefoil' in a pattern of a numerical "8." During measurement operations, there may be different methods for operating a dipole transmitter or a quadrupole transmitter.

FIG. 4A illustrates workflow 400 for operating a quadrupole source during measurement operations. Workflow 400 may begin with step 402, where an operator may select a frequency range where a quadrupole source may effectively emit horizontally-polarized shear formation body waves and a dipole receiver may effective receive the reflected horizontally-polarized shear formation body waves. For example, an optimal frequency range may be determined by using forward modeling to examine the dipole and monopole excitation/reception amplitude curves to determine the optimal frequency range where a quadrupole source has sufficient energy in that range and the dipole receiver can effectively receive the desired signal in that frequency range. In addition-suitable field test data would help establish comparable frequency bands for quadrupole and dipole emission and reception. In step 404, an operator may use one or more quadrupole sources to emit sonic waveforms 302 (e.g., referring to FIG. 3) with the selected frequency range into a formation 132 (e.g., referring to FIG. 3). In examples, the operator may control transmitter 128 and receiver 130 (e.g., referring to FIG. 3) with an information handling system 114 (e.g., referring to FIG. 1). In step 406, an operator may use one or more dipole receivers to capture reflected signals 306 or borehole guide waves 308. In step 408, the operator may process horizontally-polarized shear formation body waves to image formation 132. For example, processing may be performed on information handling system 114 and may remove borehole guide waves 308 from recorded data.

FIG. 4B illustrates workflow 410 for operating a dipole source during measurement operations. Workflow 410 may begin with step 412, where an operator may select a frequency range where a dipole source may effectively emit horizontally-polarized shear formation body waves and a quadrupole receiver may effective receive the reflected horizontally-polarized shear formation body waves. For example, an optimal frequency range may be determined by using forward modeling to examine the dipole and monopole excitation/reception amplitude curves to determine the optimal frequency range where a dipole source has sufficient energy in that range and the quadrupole receiver can effectively receive the desired signal in that frequency range. In addition-suitable field test data would help establish comparable frequency bands for quadrupole and dipole emission and reception. In step 414, an operator may use one or more dipole sources to emit sonic waveforms 302 (e.g., referring to FIG. 3) with the selected frequency range into a formation 132 (e.g., referring to FIG. 3). In examples, the operator may control transmitter 128 and receiver 130 (e.g., referring to FIG. 3) with an information handling system 114 (e.g., referring to FIG. 1). In step 416, an operator may use one or more quadrupole receivers to capture reflected signals 306 or borehole guide waves 308. In step 418, the operator may process horizontally-polarized shear formation body waves to image formation 132. For example, processing may be performed on information handling system 114 and may remove borehole guide waves 308 from recorded data. Measurements from the methods described above may increase azimuth resolution.

Figure 5A:
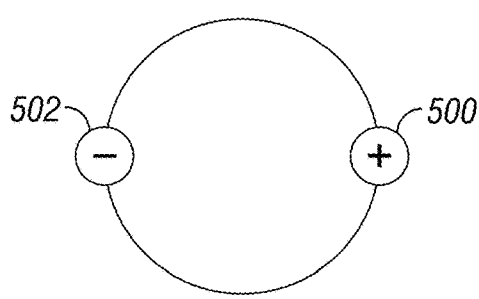
FIG. 5A illustrates a dipole transmitter and/or receiver.
Figure 5B:
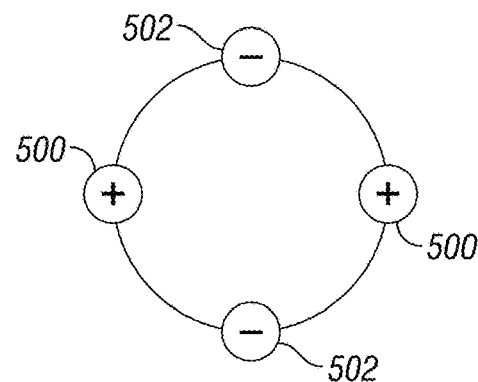
FIG. 5B illustrates a quadrupole transmitter and/or receiver.

During operations, azimuth resolution in a dipole-dipole system may be degraded. It should be noted that herein 'dipole-dipole', the first word represents the transmitter type, while the second world represents the receiver type. FIGS. 5A and 5B shows the sketch map for a dipole (FIG. 5A) and a quadrupole (FIG. 5B), represented by a combination of a number of point sources. For example, a dipole may be represented by two point sources with opposite phase, a positive phase dipole 500 and a negative phase dipole 502. During measurement operations, the dipole may emit horizontally-polarized shear formation body waves in any direction except the two azimuths where positive phase dipole 500 and negative phase dipole 502 are disposed. A quadrupole, as illustrated in FIG. 5B, may be represented by four point sources with different phases, two positive phase dipoles 500 and two negative phase dipoles 502. During measurement operations, the quadrupole may generate horizontally-polarized shear formation body waves to any azimuth except the azimuths each positive phase dipole 500 and negative phase dipole 502 are disposed. It should be noted that a dipole receiver and a quadrupole receiver may be represented by a number of point receivers and may only sense reflected signals 306 and/or borehole guide waves 308 (e.g., referring to FIG. 3) in any azimuth except the azimuth were the point receivers may be. The fields for transmission and receiver may be illustrated as a pattern in a three hundred and sixty degree path.

Figure 6:
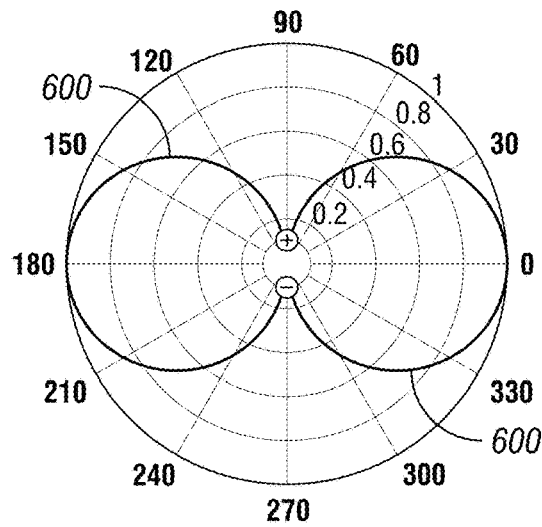
FIG. 6 is a graph of a dipole radiation and/or reception pattern.
Figure 7:
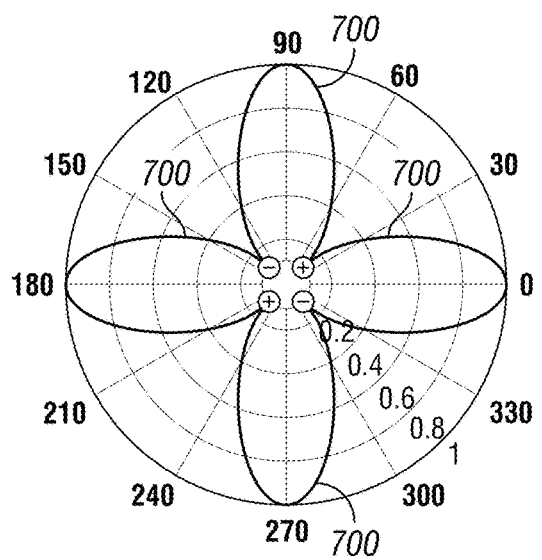
FIG. 7 is a graph of a quadrupole radiation and/or reception pattern.

For example, FIGS. 6 and 7 illustrates a theoretical radiation/receiving pattern of horizontally-polarized shear formation body waves for a dipole source and a receiver, as illustrated in FIG. 6. FIG. 7 illustrates a theoretical radiation/receiving pattern for a quadrupole source/receiver, in a fluid-filled borehole 124 (e.g., referring to FIG. 1). FIG. 6 shows that the dipole radiation pattern shows a shape of the number 8, with target azimuth at 0-degree and 180-degree. FIG. 7 shows that the quadrupole radiation pattern shows a shape of 'quatrefoil' with target azimuth at 0-, 90-, 180-, and 270-degree. Comparing FIG. 6 with FIG. 7, dipole lobe 600 may be wider than quadrupole lobe 700. The wider lobe for dipole lobe 600 may reduce resolution in determining an azimuth of horizontally-polarized shear formation body waves. Additionally, there may be two dipole lobes 600 in FIG. 6, which may allow for two areas to estimate the azimuth of horizontally-polarized shear formation body waves, as each dipole lobe 600 may have a 180-degree uncertainty in the radiation and receiving patterns. As illustrated in FIG. 7, the quadrupole pattern and four quadrupole lobes 700 may be narrower than the dipole pattern and dipole lobes 600 in FIG. 6. Therefore, quadrupole lobes 700 may have a higher azimuthal resolution. Quadrupole lobes 700 may provide four solutions for horizontally-polarized shear azimuth estimates as each quadrupole lobe 700 may have a 90-degree uncertainty in the radiation and receiving patterns. During measurement operations, utilizing the same type of source and/or receivers for measuring horizontally-polarized shear formation body waves, it may be inevitable that dipole-dipole data might provide azimuth angle with relatively low azimuth-resolution, while a quadrupole-quadrupole data might provide four possible angles for reflected signals 306 from reflector 304 (e.g., referring to FIG. 3) which might confuse an operator. As a contrast, using mixed types of transmitters and/or receives, for example, dipole-quadrupole, or quadrupole-dipole, an operator may take advantage of the two different types of sources and receivers, and provide an optimized reflector azimuth estimate.

Figure 8:
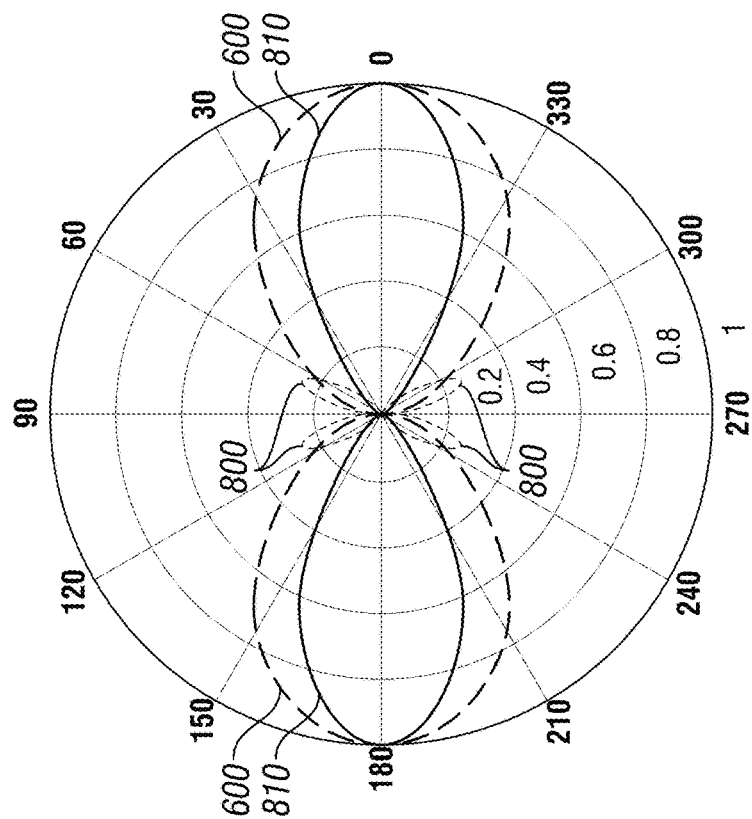
FIG. 8 is a graph of a dipole-quadrupole radiation and/or reception pattern for formation horizontal-polarized shear (SH) waves.

For example, FIG. 8 illustrates a combined pattern of horizontally-polarized shear (SH) formation body waves if a dipole-quadrupole combination is utilized, with a conventional dipole-dipole pattern including dipole lobes 600 and/or dipole-quadrupole lobes. It should be noted that dipole-quadrupole lobes include side lobes 800 and main lobes 810. Note that for the dipole-quadrupole combination, the quadrupole receiver, whose target azimuth is consistent with the dipole source, is utilized here. The target azimuth is the angle when the transducer radiation/reception reaches its maximum value. For example, dipole lobes 600 have radiation and/or receiver patterns with target azimuths of 0-degree and 180-degree. Quadrupole reception include four side lobes 800 and two main lobes 810. The azimuth of reflectors 304 (e.g., referring to FIG. 3) is determined from the maximum amplitude of reflected signals (e.g., referring to FIG. 3), i.e., the maximum at the main lobes. In examples, side lobes 800 may receive signals at a low level, which may have little influence on azimuth estimation based on the maximum value of main lobes of 810. Furthermore, 90-degree uncertainty with quadrupole lobes 700 may be removed with a dipole source emitting lobes 600 by choosing the two quadrupole lobes of 0-degree and 180-degree line up with the dipole radiation lobes, as the other two quadrupole lobes of 90-degree and 270-degree is highly suppressed by the dipole radiation lobes. It should also be noted that the width of dipole lobes may be reduced as compared to that of a dipole-dipole pattern (e.g., referring to FIG. 6), which may be due to the use of a quadrupole receiver and quadrupole lobes 700. Combining radiation patterns for dipole lobes 600 and/or quadrupole lobes 700 may increase sensitivity and measurement area.

Figure 9:
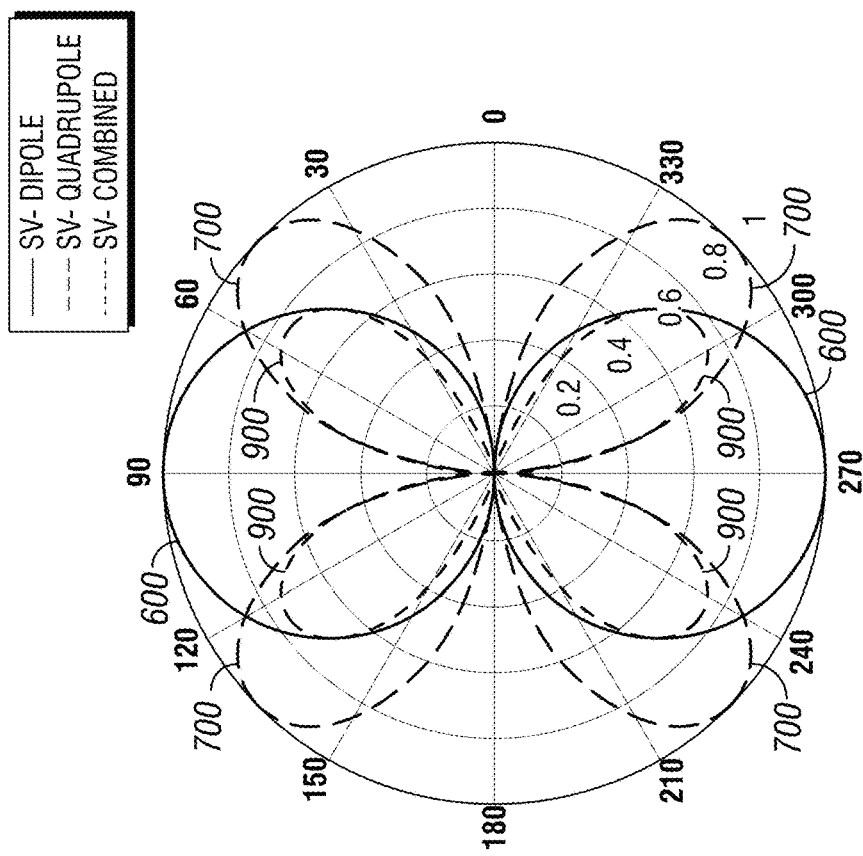
FIG. 9 is a graph of a dipole-quadrupole radiation and/or reception pattern for formation vertical-polarized shear (SV) waves.

As illustrated in FIG. 9, a radiation pattern of a combined dipole lobes 600 and quadrupole lobes 700 may produce a combined lobe 900 for vertical-polarized shear (SV) formation body waves. The primary radiation azimuths of the SV waves for dipole lobes 600 and quadrupole lobes 700 may be different and by combining dipole lobes 600 and quadrupole lobes 700 in a dipole-quadrupole scheme, the radiation/receiver pattern may decrease the maximum value of captured reflected SV waves. Thus, the interferences of SV waves on SH wave extractions will be decreased by the transmitter and receiver combination, especially at the target azimuth of SH waves (0- and 180-degree in FIG. 8). It suggests that the dipole-quadrupole combination may have an advantage over the dipole-dipole combination in estimating an azimuth of reflector 304 (e.g., referring to FIG. 3). It should be noted that a quadruple-dipole combination has the same radiation and/or receiver pattern as a dipole-quadrupole combination, by reciprocity.

Figure 10:
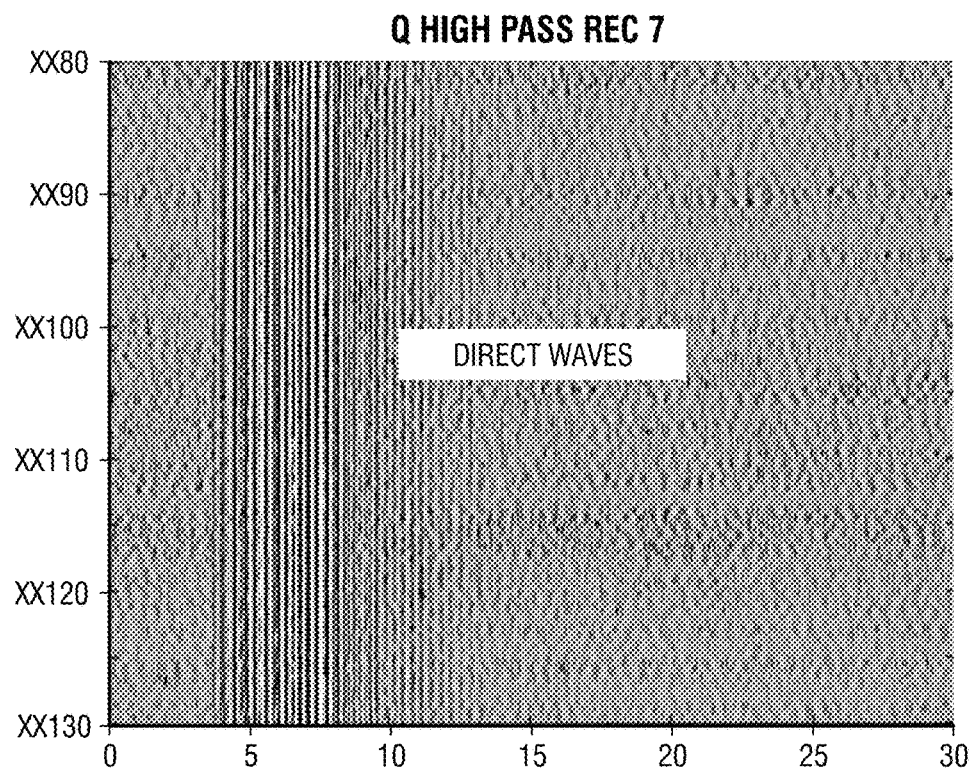
FIG. 10 is a graph of recorded data from a dipole-quadrupole combination showing raw waveforms with both borehole guided waves and reflected waves.
Figure 11:
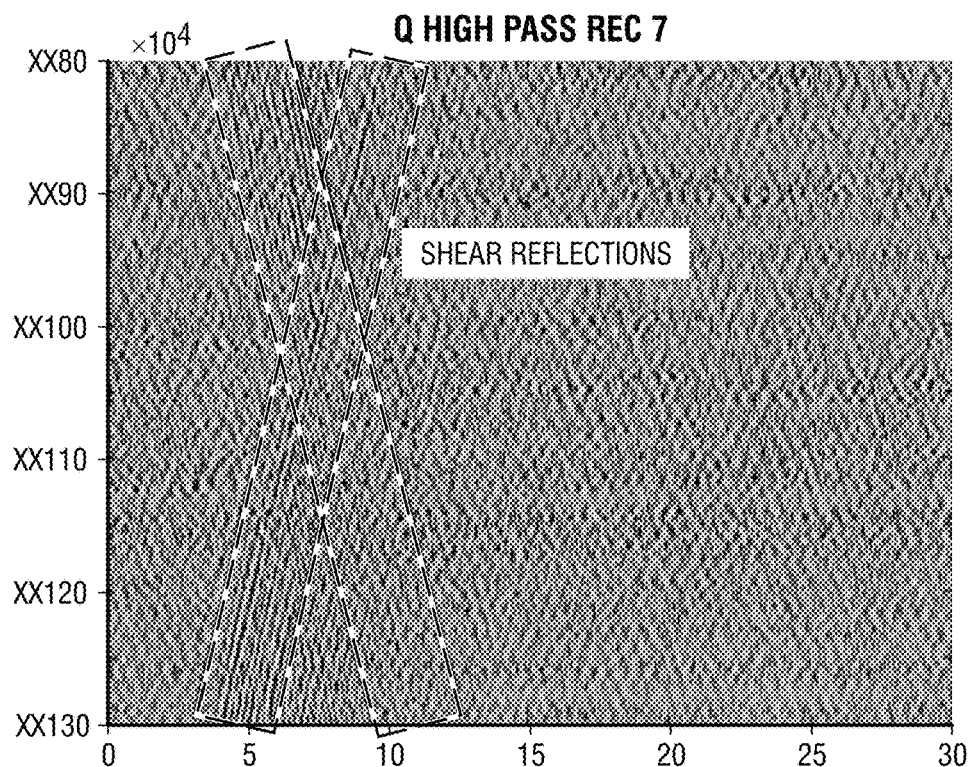
FIG. 11 is a graph of recorded data from a dipole-quadrupole combination showing shear reflections after wave separation.

FIG. 10 illustrates an example of the dipole-quadrupole reflected signals acquired by borehole sonic logging tool 102 (e.g., referring to FIG. 1). The graph illustrates that shear horizontal waves may be captured with a combination of a dipole source and a quadrupole receiver. FIG. 10 illustrates that full waves trains are acquired by the dipole-quadrupole acoustic system, where both dipole waves, coupled quadrupole waves and reflected waves are included. FIG. 11 shows the reflected shear waves separated from the waveforms in FIG. 10 by a median-filter. As illustrated, reflected shear waves are clearly captured by receiver 130 (e.g., referring to FIG. 1) which may be a dipole-quadrupole hybrid. In examples, additional processing steps may enhance the signal-to-noise ratio (SNR) of reflected signals 306 (e.g., referring to FIG. 3). For example, optimize the operation frequency, stacking and filtering the final signal for better SNR, or the practitioner may slow down the logging speed to decrease the road noise level. Processing techniques for a dipole-quadrupole hybrid borehole sonic logging tool 102 may produce dipole-quadrupole signals for imaging reflectors 304 (e.g., referring to FIG. 3) near borehole 124 (e.g., referring to FIG. 3).

FIG. 12A illustrates an example of a borehole sonic logging tool 102 with the capability for firing dipole signals and receiving quadrupole signals. In examples, borehole sonic logging tool 102 may include cross dipole transmitter (e.g., an X-dipole 1200 and a Y-dipole transmitter 1202). Borehole sonic logging tool 102 may include at least one side array receiver 1204. FIG. 12B illustrates side array receiver 1204. In examples, side array receiver 1204 may include any number of individual receivers (A-H). Combining waveforms at A, C, E and G, may produce quadrupole waveforms referring to receiver A. Combining waveforms at B, D, F and H, may produce quadrupole waveforms referring to receiver B.

Figure 13:
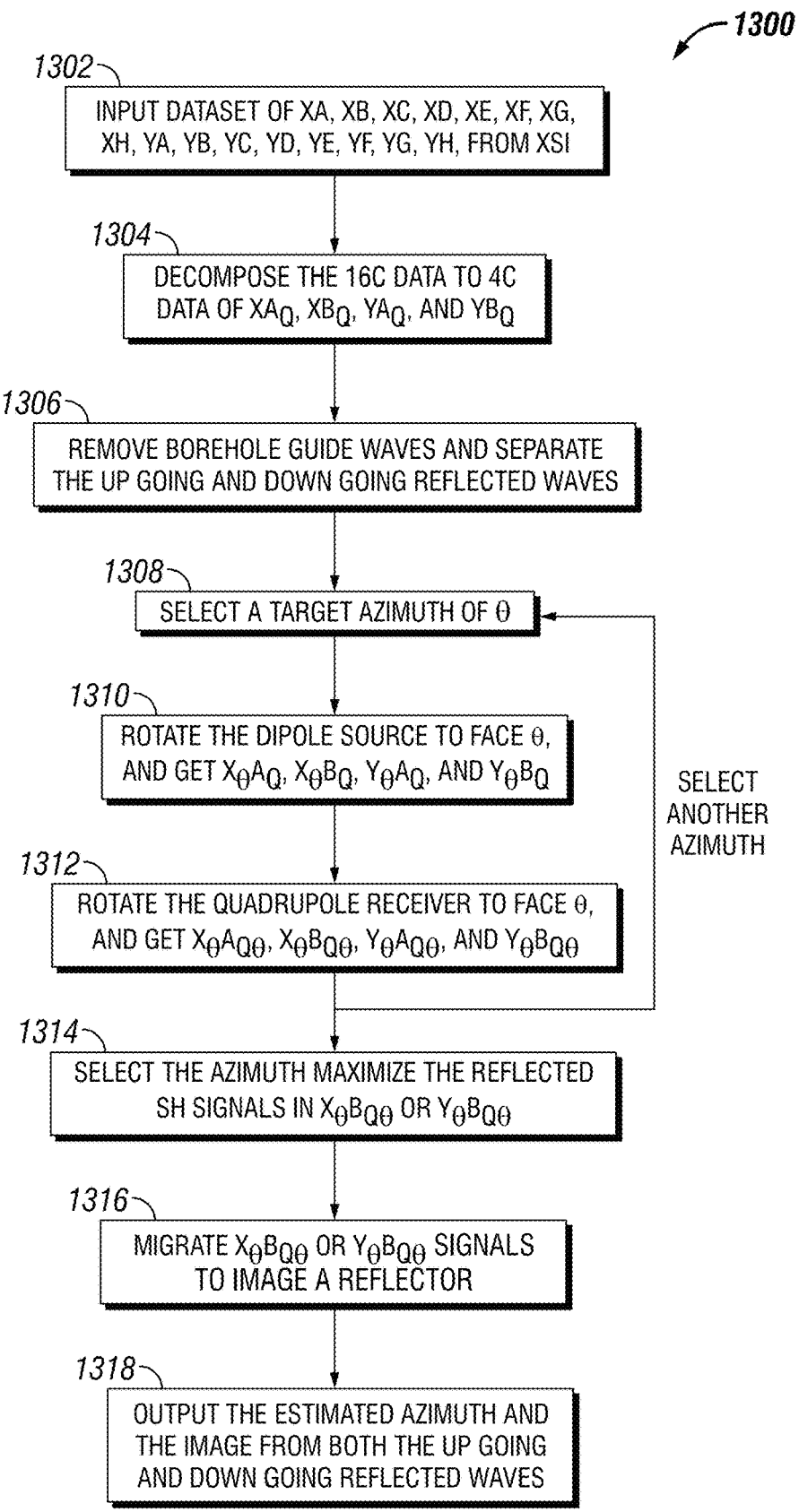
FIG. 13 displays a workflow for dipole-quadrupole processing.

FIG. 13 shows an example workflow 1300 for dipole-quadrupole processing. It should be noted that a similar workflow 1300 may be applied for quadrupole-dipole processing. In examples. Workflow 1300 may begin with step 1302. In step 1302 an operator may input a data set of sixteen components, which may include recorded data for both X and Y dipole sources firings, namely XA, XB, XC, XD, XE, XF, XG, XH, YA, YB, YC, YD, YE, YF, YG, YH recordings from a sonic logging tool 102 (e.g., referring to FIGS. 12A and 12B) and input the recorded data into an information handling system 114 (e.g., referring to FIG. 1). The operator may then decompose the 16C (e.g., sixteen component) data to 4C (four component) data of $XA_Q$, $XB_Q$, $YA_Q$, and $YB_Q$ (it should be noted that the first letter represents the dipole source, and the second letter represents the quadrupole receiver) on information handling system 114. In step 1306 an operator may remove borehole guided waves 308 and separate the up going and down going reflected signals 306 arriving from reflectors 304. In step 1308 the operator may select a target azimuth of θ. The target azimuth is the angle where the transducer radiation/reception lobe reaches its maximum value. In step 1310 the operator may rotate the dipole source to face θ, and measure $X_\theta A_Q$, $X_\theta B_Q$, $Y_\theta A_Q$, and $Y_\theta B_Q$. In step 1312 the operator may rotate the quadrupole receiver to face θ, and measure $X_\theta A_{Q\theta}$, $X_\theta B_{Q\theta}$, $Y_\theta A_{Q\theta}$, and $Y_\theta B_{Q\theta}$. As so, the two quadrupole lobes 700 are lined up with the two dipole radiation lobes (e.g., radiation lobes 600 on FIG. 9). In step 1314 the operator may select an azimuth to maximize the reflected shear horizontal signals in $X_\theta B_{Q\theta}$ or $Y_\theta A_{Q\theta}$. It should be noted that $X_\theta B_{Q\theta}$ and $Y_\theta A_{Q\theta}$ may be identified as inline components for measuring formation body shear horizontal waves. In step 1316 the operator may migrate $X_\theta B_{Q\theta}$ or $Y_\theta A_{Q\theta}$ signals to image a reflector 304. In step 1318 the operator may output the estimated azimuth and the image from both the up going and down going reflected signals 306 from reflectors 304.

Improvements over current devices and methods may be found in utilizing dipole transmitters and an array of quadrupole receivers to emit and capture shear horizontal waves for reflection imaging. By providing an alternative imaging solution to for shear horizontal imaging with dipole sources and receivers. As discussed above, methods may be provide a simpler imaging flow with less need to attenuated standard borehole guided waves.

This method and system may include any of the various features of the compositions, methods, and system disclosed herein, including one or more of the following statements.

Statement 1. A borehole sonic logging tool for imaging may comprise a transmitter configured to transmit a sonic waveform into a formation, wherein the transmitter is a dipole, and a receiver configured to record a reflected wave as waveform data, wherein the receiver is a quadrupole.

Statement 2. The borehole sonic logging tool of statement 1, wherein the borehole sonic logging tool is disposed on a conveyance.

Statement 3. The borehole sonic logging tool of statements 1 or 2, wherein the borehole sonic logging tool is disposed on a bottom hole assembly.

Statement 4. The borehole sonic logging tool of statements 1-3, further comprising one or more receivers, wherein the one or more receivers are each quadrupoles.

Statement 5. The borehole sonic logging tool of statements 1-4, wherein the transmitter is the quadrupole.

Statement 6. The borehole sonic logging tool of statement 5, wherein the receiver is the dipole.

Statement 7. The borehole sonic logging tool of statement 6, further comprising one or more receivers, wherein the one or more receivers are each dipoles.

Statement 8. The borehole sonic logging tool of statements 1-4 and 5, further comprising an information handling system configured to at least partially process the waveform data.

Statement 9. A method for measuring a horizontal-polarized shear wave may comprise disposing a downhole tool into a borehole, wherein the downhole tool may comprise a transmitter configured to transmit a sonic waveform into a formation, wherein the transmitter is a dipole; and a receiver configured to record a response from a borehole, wherein the receiver is a quadrupole; selecting a frequency range for the transmitter to a horizontally-polarized shear formation body wave; broadcasting the sonic waveform as the horizontally-polarized shear formation body wave into the formation penetrated by the borehole with the transmitter; recording a reflected wave on the receiver as waveform data, wherein the reflected wave is the horizontally-polarized shear formation body wave reflected from a reflector; and processing the waveform data with an information handling system.

Statement 10. The method of statement 9, wherein the transmitter is the quadrupole.

Statement 11. The method of statement 10, wherein the receiver is the dipole.

Statement 12. The method of statement 9, further comprising recording a borehole guide wave.

Statement 13. The method of statement 12, further comprising removing the borehole guide wave during the processing the waveform data.

Statement 14. A method for processing a dipole-quadrupole signal may comprise inputting a sixteen component data set into an information handling system; decomposing the sixteen component data set to a four component data set with the information handling system; removing borehole guide waves from the four component data set with the information handling system; separating reflected waves as up going signals and down going signals; selecting a target azimuth of $\theta$; rotating a dipole transmitter to face $\theta$; rotating a quadrupole receiver to face $\theta$; selecting a second azimuth to record horizontally-polarized shear waves; imaging a reflector from a formation; and displaying an image of the reflector.

Statement 15. The method of statement 14, wherein the sixteen component data set comprises variables XA, XB, XC, XD, XE, XF, XG, XH, YA, YB, YC, YD, YE, YF, YG, and YH.

Statement 16. The method of statements 14 or 15, wherein the four component data set comprises variables $XA_Q$, $XB_Q$, $YA_Q$, and $YB_Q$.

Statement 17. The method of statements 14-16, wherein the rotating the dipole transmitter to face $\theta$ measures variable $X_\theta A_Q$, $X_\theta B_Q$, $Y_\theta A_Q$, and $Y_\theta B_Q$.

Statement 18. The method of statements 14-17, wherein the rotating the quadrupole receiver to face $\theta$ measures $X_\theta A_{Q\theta}$, $X_\theta B_{Q\theta}$, $Y_\theta A_{Q\theta}$, and $Y_\theta B_{Q\theta}$.

Statement 19. The method of statements 14-18, wherein the horizontally-polarized shear waves are measured in $X_\theta B_{Q\theta}$ or $Y_\theta A_{Q\theta}$ directions.

Statement 20. The method of statements 14-19, wherein the imaging the reflector from the formation is at least partially from measurements in $X_\theta B_{Q\theta}$ or $Y_\theta A_{Q\theta}$ directions.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A borehole sonic logging tool for imaging comprising:
a hybrid transmitter and receiver combination comprising:
   a plurality of dipole transmitters to transmit a plurality of dipole sonic waveform into a formation; and
   a plurality of receivers to receive sonic waveforms from the formation, wherein the plurality of receivers are arranged in an azimuthal array around the logging tool and configured to detect reflected waves from a dipole transmission from the plurality of dipole transmitters; and
an information handling system in communication with the hybrid transmitter and receiver combination, wherein the information handling system;
   selects a frequency range for the plurality of dipole transmitters to transmit a horizontally-polarized shear formation body wave using a forward model;
   combines detected reflected waves from a first subset of the plurality of receivers in the azimuthal array to produce a first quadrupole waveform, and combines received detected waves from a second subset of the plurality of receivers in the azimuthal array to produce a second quadrupole waveform;
   determines at least part of a target azimuth;
   rotates the hybrid transmitter and receiver towards the target azimuth;
   receives waveform data with the hybrid transmitter and receiver combination from a reflection interface of the horizontally-polarized shear formation body wave within the formation;
   separates from the waveform data one or more reflected signals from one or more borehole signals;
   enhances the signal-to-noise ratio of the one or more reflected signals;
   filters the one or more reflected signals with a median filter; and
   processes the reflected signals to form an image.

2. The borehole sonic logging tool of claim 1, wherein the borehole sonic logging tool is disposed on a conveyance.

3. The borehole sonic logging tool of claim 1, wherein the borehole sonic logging tool is disposed on a bottom hole assembly.

4. The borehole sonic logging tool of claim 1, wherein the information handling further determines an optimal frequency range with forward modeling.

5. The borehole sonic logging tool of claim 4, wherein the at least one of the plurality of receivers records a borehole guide wave.

6. The borehole sonic logging tool of claim 5, wherein the information handling system removes the borehole guide wave during the determining an optimal frequency range with forward modeling.

7. A method comprising:
disposing a downhole tool into a borehole, wherein the downhole tool comprises:
   a hybrid transmitter and receiver combination comprising:
      a plurality of dipole transmitters to transmit a sonic waveform into a formation; and
      a plurality of receivers to receive sonic waveforms from the formation, wherein the plurality of receivers are arranged in an azimuthal array around the logging tool and configured to detect reflected waves from a dipole transmission from the plurality of dipole transmitters; and
selecting a frequency range for the transmitter to a horizontally-polarized shear formation body wave;
determining at least part of a target azimuth;
rotating the hybrid transmitter and receiver combination towards the target azimuth;
broadcasting the sonic waveform as the horizontally-polarized shear formation body wave into the formation penetrated by the borehole with the transmitter;
recording reflected waves on the plurality of receivers as waveform data; and
combining the recorded waveform data from a first subset of the plurality of receivers in the azimuthal array to produce a first quadrupole waveform, and combining the recorded waveform data from a second subset of the plurality of receivers in the azimuthal array to produce a second quadrupole waveform.

8. The method of claim 7, further comprising recording a borehole guide wave.

9. The method of claim 8, further comprising removing the borehole guide wave during the processing the waveform data.

10. The method of claim 7, further comprising enhancing the signal-to-noise ratio of reflected signals during the processing the waveform data.

11. The method of claim 7, further comprising filtering the reflected wave with a median filter during the processing the waveform data.

12. The method of claim 7, further comprising determining an optimal frequency range using forward modeling.

* * * * *